United States Patent [19]

Baum et al.

[11] Patent Number: 4,873,627

[45] Date of Patent: * Oct. 10, 1989

[54] METHOD AND MEANS FOR CONDITIONAL STORING OF DATA IN A REDUCED INSTRUCTION SET COMPUTER

[75] Inventors: Allen J. Baum, Palo Alto; Terrence C. Miller, Menlo Park; David A. Fotland, San Jose, all of Calif.

[73] Assignee: Hewlett-Packard Company, Palo Alto, Calif.

[ * ] Notice: The portion of the term of this patent subsequent to May 24, 2005 has been disclaimed.

[21] Appl. No.: 139,508

[22] Filed: Dec. 30, 1987

Related U.S. Application Data

[62] Division of Ser. No. 750,809, Jun. 28, 1985, Pat. No. 4,747,046.

[51] Int. Cl.$^4$ .............................................. G06F 9/28
[52] U.S. Cl. .................................................... 364/200
[58] Field of Search ................................. 364/200, 900

[56] References Cited

U.S. PATENT DOCUMENTS 4,569,016  2/1986  Hao et al. ............................. 364/200
4,589,065  5/1986  Auslander et al. ................... 364/200
4,615,004  9/1986  Chevillat et al. ..................... 364/200
4,654,786  3/1987  Cochran et al. ...................... 364/200

OTHER PUBLICATIONS

Patterson, D. A. and Sequin, C. H., "A VLSI RISC", Computer, Sep. 1982, pp. 8–21.

Primary Examiner—David L. Clark
Attorney, Agent, or Firm—William H. F. Howard

[57] ABSTRACT

In a computer device in accordance with the preferred embodiment of the invention, an instruction set which uses a two-instruction sequence to store the result of a comparison is provided. The two-instruction sequence, which uses no branch instructions, does not need to wait for condition resolution before storing conditional results. Additionally, it also is capable of implementing slightly more general operations than simply storing a zero or one value of a comparison. Basically, the instruction set in accordance with the invention compares two operands and unconditionally stores a zero, which represents a Boolean "false", into a selected destination. The instruction set then conditionally nullifies the instruction following it, thus effecting a highly efficient execution of a sequence of instructions compared to the prior art.

4 Claims, 3 Drawing Sheets

METHOD AND MEANS FOR CONDITIONAL STORING OF DATA IN A REDUCED INSTRUCTION SET COMPUTER cl CROSS REFERENCE TO RELATED APPLICATION

This is a division of application Ser. No. 750,809 filed June 28, 1985, now U.S. Pat. No. 4,747,046.

BACKGROUND AND SUMMARY OF THE INVENTION

In a prior art computer with microprogramming, the control section of such a computer generally is provided with an autonomous read-only storage Each time a program instruction begins, the control unit generates an address to its read-only storage derived from the function or operation code of the instruction. This address locates what may be the first of a series of words which supply the control signals to the computer for carrying out the particular instruction being processed Each instruction in effect generates a transfer to a microsubroutine associated with it, and the resultant step-by-step operation of the machine corresponds to the execution of a program on a very detailed level.

In such a computer in the prior art, program instructions generally comprise an operation code, i.e., the opcode, together with information relative to the location of the operands, that ' is, the data to be operated on. These operands sometimes may also have additional operational information. The length of the program instructions may be relatively long or relatively short depending on the quantity of data involved. The operating codes generally indicate the operation to be performed. Once the length of the operating code is established, it is possible to have only a certain fixed set of different operating codes and related program instructions. However, not all the operating codes which may theoretically be expressed with a certain number of bits, i.e., operating codes within the fixed set, are used to characterize program instructions for which the computer is provided with microprogramming resources. Generally, only a part or subset is used, and thus programming efficiency is degraded.

Also in a prior art computer, the memory of the computer provides the largest hardware cost. Therefore, the key to hardware speed and minimum size lies in efficient use of the memory. Fixed instruction length computers require the same number of bits for each instruction word regardless of the simplicity or complexity of the operation to be executed. As an example, many bits can be wasted in instructions which specify simple operations, while many instructions can be wasted in complex operations where an instruction's capability is limited by its length. Therefore, it is desired to design a computer with an instruction set which can perform all applications most efficiently.

To increase the efficiency of microprogramming in the prior art, the concept of optimizing compilers is used and implemented (1) to compile programming languages down to instructions that are as unencumbered as microinstructions in a large virtual address space and (2) to make the instruction cycle time as fast as the technology would allow. Computers having such optimized compilers are designed to have fewer instructions than those in the prior art, and what few instructions they do have are simple and would generally execute in one cycle. Such computers have been aptly named reduced instruction set computers (RISCs). Instructions that are part of a reduced instruction set in a RISC machine and that provide increased efficiency in a novel way have been invented and are described herein.

Specifically, many programs have methods to evaluate a condition and to store the results of the evaluation into a Boolean variable Most computer instruction sets in the prior art, however, can only use a condition, which is usually the result of a comparison, to affect a branching decision and not to materialize the condition as a value.

An example of one of these prior art instruction sets is an instruction set which compiles a code that uses the condition to branch around the code that sets or clears bits. This instruction set is generally slow and involves conditional branches which can flush the pipeline of high-performance processors.

Another example is a prior art instruction set which implements special instructions which put a bit which is the condition value into a register. This instruction set involves waiting until the condition is selected and resolved before storing the result This operation, which uses different timing, is slower than selecting and storing the result of an arithmetic operation.

In accordance with the preferred embodiment of the invention, an instruction set uses a two instruction sequence to store the result of a comparison. The two instruction sequence uses no branch instructions, and does not wait for condition resolution before storing results. It can also implement slightly more general operations than simply storing a zero or one value of a comparison Basically, the novel instruction set compares two operands and unconditionally stores a zero, which represents a Boolean "false", into a selected destination. The instruction set also conditionally nullifies the instruction following it.

DETAILED DESCRIPTION OF THE INVENTION

Functionally the purpose of an instruction set in the computer device in accordance with the preferred embodiment of the invention is to compare the contents of two registers, clear a register, and conditionally execute a following instruction based on the result of the comparison. In other words, the contents of two general registers, for example, "rb" and "rc", are compared and a third general register "ra" is cleared to zero. The instruction in the next execution cycle following the comparison instruction is conditionally executed; it is nullified if the condition is satisfied. The condition may be any of the arithmetic conditions or their negations.

Figure 1:
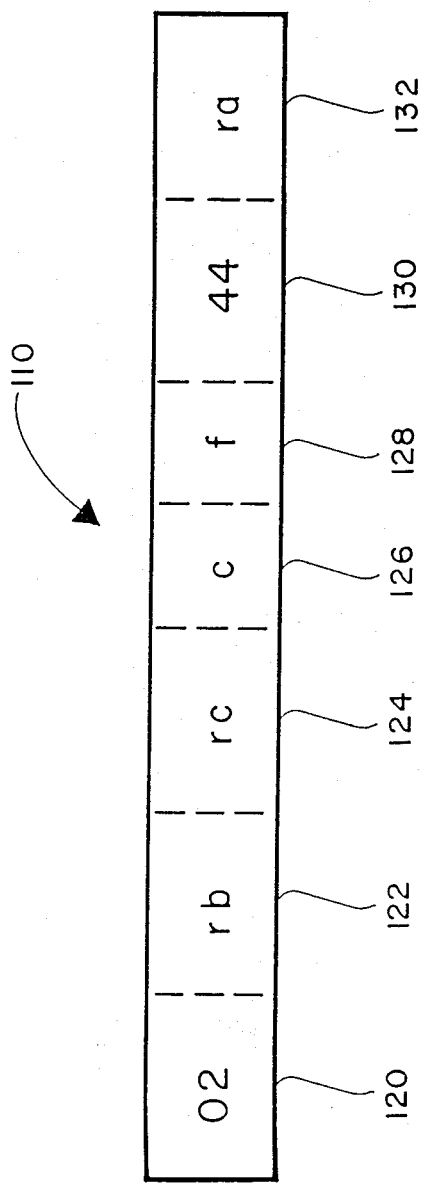
FIG. 1 shows the instruction for compare and clear contained in the computer device in accordance with the preferred embodiment of the invention.

This instruction for compare and clear, COMCLR, is denoted as follows:

COMCLR, cf rb,rc,ra,
where:
cf is the arithmetic condition or its negation;

rb and rc are the general registers whose contents are being compared; and ra is the general register being cleared, and has the format shown in FIG. 1, namely, 02 / rb / rc / c / f / 44 / ra, where:
- 02 is a 6-bit field 120 identifying an arithmetic/logic class of instruction;
- rb is a 5-bit field 122 specifying general register "b" whose content is being compared (register source "b");
- rc is a 5-bit field 124 specifying general register "c" whose content is being compared (register source "c");
- c is a 3-bit condition specifier 126;
- f is a 1-bit condition negation specifier 128;
- 44 is a 7-bit operation code extension 130; and
- ra is 5-bit field 132 specifying general register "a" whose content is being cleared (register target "a").

In operation, the instruction set 110 proceeds as follows:

1. During the first cycle, T:
    a. sum the content of general register "rb" with the one's complement of general register "rc" and "1"; and
    b. assign "0" to general register "ra".
2. During the second cycle, T+1:
    if the condition defined by (c,f) is met, then nullify the instruction being executed in this cycle T+1.

Figure 2:
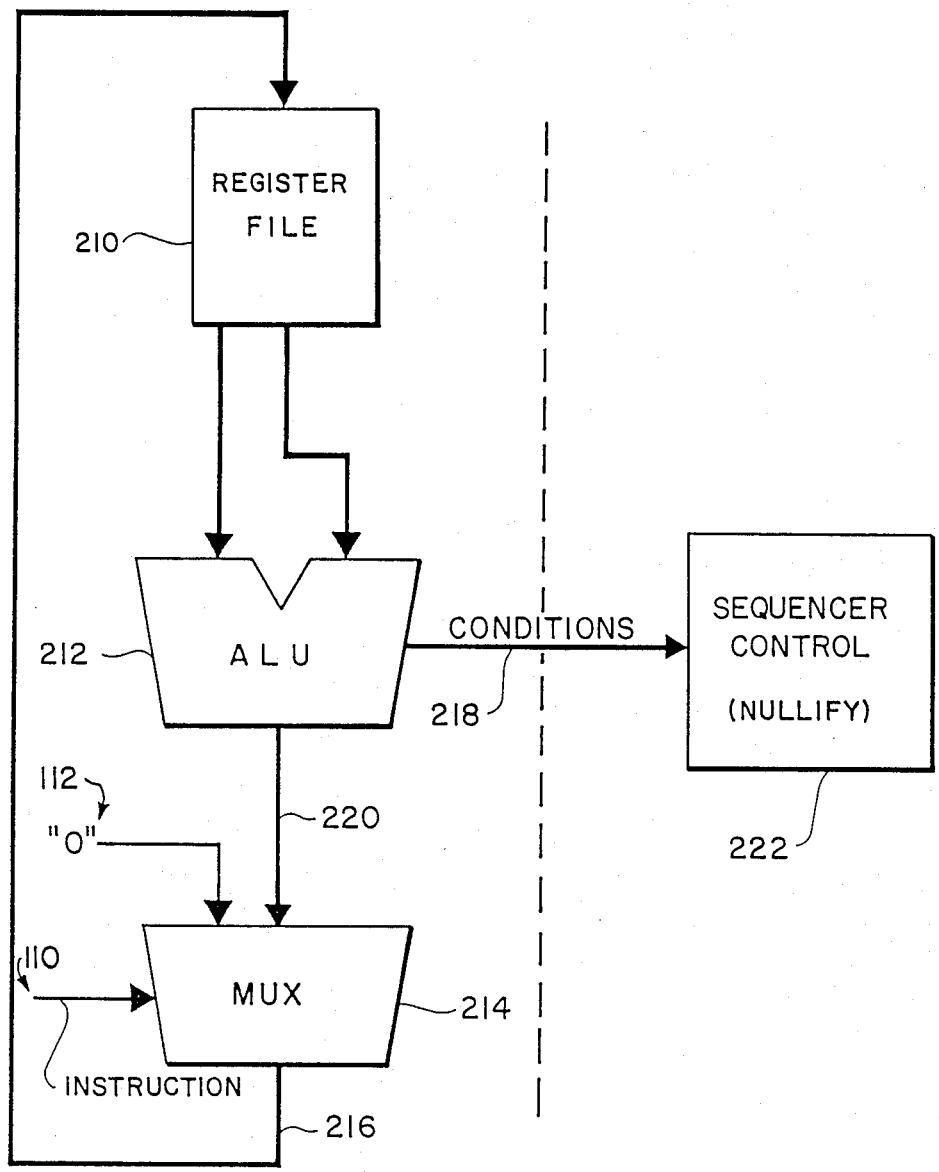
FIG. 2 shows the functional blocks in the computer device in accordance with the preferred embodiment of the invention for implementing the instruction set of FIG. 1.
Figure 3:
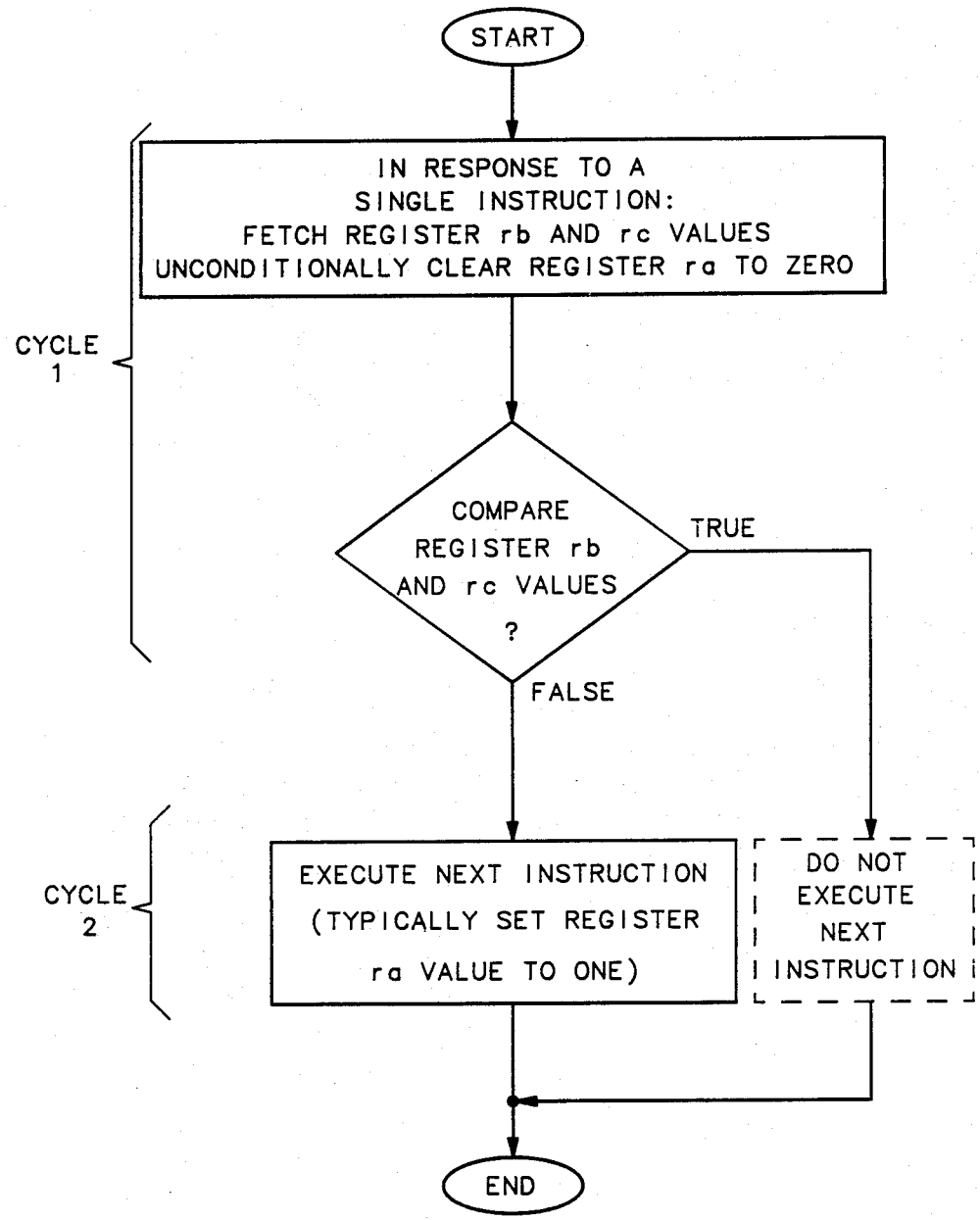
FIG. 3 is a flow chart depicting the method of one embodiment of this invention.

The operation of this compare and clear instruction set 110 is shown in FIG. 2. There, contents of registers "rb" and "rc" (not shown) from a register file 210 are compared in an arithmetic-logic unit (ALU) 212. Specifically, the content of register "rb" is summed with the one's complement of the content of register "rc". A multiplexer (MUX) 214 provides an output 216 in response to an input 220 from the ALU 212, the instruction code 110 and a "0" input. This output 216 is transferred to the register file 210 and written into register "ra". The result of the comparison in the ALU 212 is subjected to preselected conditions 218 and transferred to a sequencer control unit 222, which determines whether nullification of the next instruction is required, depending on the preselected conditions This operation then provides a smooth, straightforward, and efficient method of evaluating a condition and storing the result of the evaluation into a Boolean variable. This is accomplished by, in a first computer cycle, in response to a received instruction, fetching the contents of registers rb and rc, comparing the value of registers rb and rc, and unconditionally clearing register ra to zero and, in a second computer cycle if required, setting register ra to 1.

We claim:

1. A method for handling data conditionally in a computer device comprising the steps of:
    receiving a single instruction; and
    in response to said single instruction:
        fetching and comparing in accordance with a selected condition two selected values from a first and a second register, respectively; and
        clearing a third register unconditionally.
2. The method for handling data as in claim 1, wherein said steps of fetching and comparing and clearing are performed within a single cycle of said computer device.
3. The method for handling data as in claim 1, further comprising the step of nullifying an instruction to be performed during a second cycle following said single cycle in response to meeting said condition.
4. The method for handling data as in claim 3, wherein said step of nullifying is performed within said single cycle of said computer device.

* * * * *